(12) United States Patent
Zheng

(10) Patent No.: US 10,733,257 B2
(45) Date of Patent: Aug. 4, 2020

(54) SHORT-LINK PARSING METHODS, APPARATUS, AND DEVICES

(71) Applicant: Alibaba Group Holding Limited, George Town (KY)

(72) Inventor: Li Zheng, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/698,253

(22) Filed: Nov. 27, 2019

(65) Prior Publication Data

US 2020/0097513 A1    Mar. 26, 2020

Related U.S. Application Data

(63) Continuation of application No. PCT/CN2018/102445, filed on Aug. 27, 2018.

(30) Foreign Application Priority Data

Aug. 28, 2017    (CN) .......................... 2017 1 0748157

(51) Int. Cl.
  *G06F 17/30*  (2006.01)
  *G06F 16/955*  (2019.01)
  (Continued)

(52) U.S. Cl.
  CPC ........ G06F 16/9558 (2019.01); G06F 16/137 (2019.01); G06F 16/9562 (2019.01);
  (Continued)

(58) Field of Classification Search
  CPC ............. G06F 16/9558; G06F 16/9562; G06F 16/137; H04L 67/327; H04L 67/1076; H04L 45/12; H04L 67/02
  See application file for complete search history.

(56) References Cited

U.S. PATENT DOCUMENTS 6,957,224 B1    10/2005  Megiddo et al.
7,698,269 B2 *   4/2010  Zhou ................... G06F 16/9566
                                                          707/999.006
(Continued)

FOREIGN PATENT DOCUMENTS

CN    102577302    7/2012
CN    102810089    12/2012
(Continued)

OTHER PUBLICATIONS

Gupta et al. "bit.ly/malicious: Deep dive into short URL based e-crime detection," 2014 APWG Symposium on Electronic Crime Research (eCrime), Birmingham, AL, 2014, pp. 14-24.*

(Continued)

*Primary Examiner* — Maikhanh Nguyen

(74) *Attorney, Agent, or Firm* — Fish & Richardson P.C.

(57) ABSTRACT

Disclosed herein are methods, systems, and apparatus, including computer programs encoded on computer storage media, for implementing a blockchain-based web service. One of the methods includes receiving an access request based on a short link. The short link of the access request is processed to obtain a long link corresponding to the short link. It is determined that the long link satisfies a predefined long link regular expression that is sent by a configuration server. The access request to the long link is redirected after determining that the long link satisfies the predefined long link regular expression.

17 Claims, 6 Drawing Sheets

(51) Int. Cl.
  *H04L 29/08* (2006.01)
  *H04L 12/721* (2013.01)
  *G06F 16/13* (2019.01)
(52) U.S. Cl.
  CPC .............. *H04L 45/12* (2013.01); *H04L 67/02* (2013.01); *H04L 67/1076* (2013.01); *H04L 67/327* (2013.01)

(56) References Cited

U.S. PATENT DOCUMENTS

| | | | | |
|---|---|---|---|---|
| 8,381,276 | B2* | 2/2013 | Costinsky | H04L 67/02 |
| | | | | 726/6 |
| 8,630,200 | B2* | 1/2014 | St. Jean | G06F 16/9566 |
| | | | | 370/252 |
| 8,862,699 | B2* | 10/2014 | Bhatawdekar | G06F 21/566 |
| | | | | 709/219 |
| 9,210,229 | B2* | 12/2015 | McIntosh | H04L 67/02 |
| 9,497,278 | B2* | 11/2016 | McIntosh | H04L 67/02 |
| 9,549,035 | B2* | 1/2017 | Duncan | H04L 67/2814 |
| 9,742,661 | B2* | 8/2017 | Klais | H04L 67/327 |
| 9,906,602 | B1* | 2/2018 | McIntosh | H04L 67/02 |
| 10,057,207 | B2* | 8/2018 | Kaliski, Jr. | G06F 16/9566 |
| 2007/0124500 | A1* | 5/2007 | Bedingfield, Sr. | |
| | | | | G06F 16/9566 |
| | | | | 709/245 |
| 2007/0136279 | A1 | 6/2007 | Zhou et al. | |
| 2009/0254425 | A1* | 10/2009 | Horowitz | G06Q 10/10 |
| | | | | 705/300 |
| 2009/0300768 | A1 | 12/2009 | Balachander et al. | |
| 2009/0327489 | A1 | 12/2009 | Swildens et al. | |
| 2010/0268739 | A1* | 10/2010 | Zalepa | G06F 16/9566 |
| | | | | 707/782 |
| 2011/0145435 | A1* | 6/2011 | Bhatawdekar | G06F 21/566 |
| | | | | 709/238 |
| 2011/0295990 | A1* | 12/2011 | St. Jean | G06F 16/9566 |
| | | | | 709/223 |
| 2012/0078782 | A1* | 3/2012 | Schoenberg | G06Q 20/102 |
| | | | | 705/40 |
| 2013/0282714 | A1* | 10/2013 | Lathrom | G06F 16/955 |
| | | | | 707/736 |
| 2014/0143337 | A1* | 5/2014 | McIntosh | H04L 67/02 |
| | | | | 709/204 |
| 2014/0280468 | A1* | 9/2014 | Duncan | H04L 67/2814 |
| | | | | 709/203 |
| 2014/0280919 | A1* | 9/2014 | Lakes | G06Q 30/0601 |
| | | | | 709/224 |
| 2015/0254251 | A1* | 9/2015 | Adams | G06F 17/00 |
| | | | | 707/709 |
| 2016/0088104 | A1* | 3/2016 | McIntosh | H04L 67/02 |
| | | | | 705/14.42 |
| 2016/0140447 | A1 | 5/2016 | Cohen et al. | |
| 2018/0011942 | A1* | 1/2018 | Zaretsky | G06F 16/9566 |
| 2019/0280916 | A1* | 9/2019 | Lakes | H04L 67/2814 |

FOREIGN PATENT DOCUMENTS

| | | |
|---|---|---|
| CN | 102902780 | 1/2013 |
| CN | 102917307 | 2/2013 |
| CN | 103678333 | 3/2014 |
| CN | 104065736 | 9/2014 |
| CN | 106202187 | 12/2016 |
| CN | 106375189 | 2/2017 |
| CN | 106412140 | 2/2017 |
| CN | 106933854 | 7/2017 |
| CN | 106933871 | 7/2017 |
| CN | 107733972 | 2/2018 |
| WO | WO 03007162 | 1/2003 |
| WO | WO 2007025869 | 3/2007 |

OTHER PUBLICATIONS

Liu et al., "TraffickStop: Detecting and Measuring Illicit Traffic Monetization Through Large-Scale DNS Analysis," 2019 IEEE European Symposium on Security and Privacy (EuroS&P), Stockholm, Sweden, 2019, pp. 560-575.*

Wang et al. "Click traffic analysis of short URL spam on Twitter," 9th IEEE International Conference on Collaborative Computing: Networking, Applications and Worksharing, Austin, TX, 2013, pp. 250-259.*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/102445, dated Nov. 15, 2018, 9 pages (with partial English translation).

PCT International Preliminary report on Patentability in International Appln. No. PCT/CN2018/102445, dated Mar. 3, 2020, 5 pages.

Extended European Search Report in European Appln No. 18851906.0, dated Apr. 30, 2020, 10 pages.

* cited by examiner

SHORT-LINK PARSING METHODS, APPARATUS, AND DEVICES

CROSS-REFERENCE TO RELATED APPLICATIONS

This application is a continuation of PCT Application No. PCT/CN2018/102445, filed on Aug. 27, 2018, which claims priority to Chinese Patent Application No. 201710748157.6, filed on Aug. 28, 2017, and each application is hereby incorporated by reference in its entirety.

TECHNICAL FIELD

The present application relates to the field of computer technologies, and in particular, to short-link parsing methods, apparatus, and devices.

BACKGROUND

With continuous development of Internet technologies, a service provider (for example, a website, a bank, or a telecommunications operator) can release corresponding service promotion information to a user through social media (for example, a social software client or a social network) or an SMS message. The released service promotion information is usually in a form of a uniform resource locator (URL). As such, the user can access a corresponding page by using the URL to obtain service content. However, due to a limitation on the number of words of social media content or SMS message content, the service provider usually converts the URL to a short link.

In the existing technology, after receiving a corresponding short link request, a service provider usually determines a short code value corresponding to a short link, queries, based on the short code value, a URL that is stored in a database and that corresponds to the short code value, and performs redirection.

Based on the existing technology, a more effective short-link parsing method is needed.

SUMMARY

Implementations of the present specification provide a short-link parsing method, apparatus, and device, to provide a more effective short-link parsing method.

An implementation of the present specification provides a short-link parsing method. The method can be used on a parsing server side, and the method includes: receiving an access request based on a short link; parsing the short link based on the access request, to obtain a long link that matches the short link; checking, based on a predefined long link regular expression, the long link obtained through parsing, where the long link regular expression is sent by a configuration server; and redirecting the access request to the long link obtained through parsing after the check succeeds.

An implementation of the present specification further provides a short-link parsing method. The method can be used on a configuration server side, and the method includes: receiving a regular expression that is input through editing and that is used to represent a long link structure; and sending the regular expression to each parsing server, so that any one of the parsing servers checks and redirects a received short link request based on the regular expression.

Based on the same idea, an implementation of the present specification provides a short link parsing apparatus. The apparatus can be used on a parsing server side, and the apparatus includes: a request receiving module, configured to receive an access request based on a short link; a parsing module, configured to parse the short link based on the access request, to obtain a long link that matches the short link; a checking module, configured to check, based on a predefined long link regular expression, the long link obtained through parsing, where the long link regular expression is sent by a configuration server; and a redirection module, configured to redirect the access request to the long link obtained through parsing after the check succeeds.

Similarly, an implementation of the present specification further provides a short link parsing apparatus. The apparatus can be used on a configuration server side, and the apparatus includes: a receiving module, configured to receive a regular expression that is input through editing and that is used to represent a long link structure; and a sending module, configured to send the regular expression to each parsing server, so that any one of the parsing servers checks and redirects a received short link request based on the regular expression.

Based on the same idea, an implementation of the present specification further provides a short link parsing device on a parsing server side. The device includes: a memory, configured to store a short link parsing program; a communications interface, configured to receive an access request based on a short link; and a processor, configured to call the short link parsing program stored in the memory and perform the following operations after the communications interface receives the access request based on the short link: parsing the short link based on the access request, to obtain a long link that matches the short link; checking, based on a predefined long link regular expression, the long link obtained through parsing, where the long link regular expression is sent by a configuration server; and redirecting the access request to the long link obtained through parsing after the check succeeds.

In addition, an implementation of the present specification provides a short link parsing device on a configuration server side. The device includes: a memory, configured to store a regular expression configuration program; a communications interface; and a processor, configured to call the regular expression configuration program stored in the memory and perform the following operations: receiving a regular expression that is input through editing and that is used to represent a long link structure; and sending the regular expression to each parsing server through the communications interface, so that any one of the parsing servers checks and redirects a received short link request based on the regular expression.

The previous at least one technical solution used in the implementations of the present specification can achieve the following beneficial effects:

The configuration server sends the defined regular expression to each parsing server, so that each parsing server checks a parsing result (a long link obtained through parsing) of a short link based on the regular expression. A secure domain name can be dynamically controlled by means of the manner of the regular expression. When a corresponding secure domain name needs to be deleted, added, or modified, the configuration server can synchronize an updated regular expression to each parsing server in real time.

In addition, the configuration server can configure a corresponding content delivery network (CDN) traffic limiting page and a traffic limiting threshold of a corresponding domain name. As such, access pressure of the parsing server can be alleviated, user access experience can be ensured, and centralized management and control of traffic entries can be implemented by using a traffic limiting mechanism based on a domain name granularity.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and constitute no limitation on the present application. In the accompanying drawings.

DETAILED DESCRIPTION OF IMPLEMENTATIONS

To make the objective, technical solutions, and advantages of the present application clearer, the following clearly and comprehensively describes the technical solutions of the present application with reference to specific implementations and the corresponding accompanying drawings of the present application. Apparently, the described implementations are merely some but not all of the implementations of the present application. All other implementations obtained by a person of ordinary skill in the art based on the implementations of the present application without creative efforts shall fall within the protection scope of the present application.

In one or more implementations of the present specification, a short link usually can be generated based on a normal URL. For example, the short link is obtained through calculation by using a hash algorithm based on the URL. In practice, the short link can be obtained through conversion by using a corresponding algorithm based on a long link, and the generated short link corresponds to the long link. For ease of description, the normal URL is referred to as a long link.

In some implementations, the short link can be in a form of "a domain name+a short code value". For example, for the short link Http://t.cn/8aabb, "t.cn" is a domain name, and "8aabb" is a short code value. It is worthwhile to note that the domain name in the short link can be considered as a short domain name. Certainly, there is a definite mapping relationship between the short domain name and a normal domain name, and the mapping relationship usually can be set and defined by a service provider. Details are omitted here.

In some other implementations, the short link can be alternatively in a form of a specific string. To be specific, in this form, a domain name and a short code value are not distinguished in the short link, and instead the short link is a specific string that uniquely points to a certain long link.

Certainly, a specific form of the short link is usually determined based on an actual demand. Details are omitted here.

Figure 1:
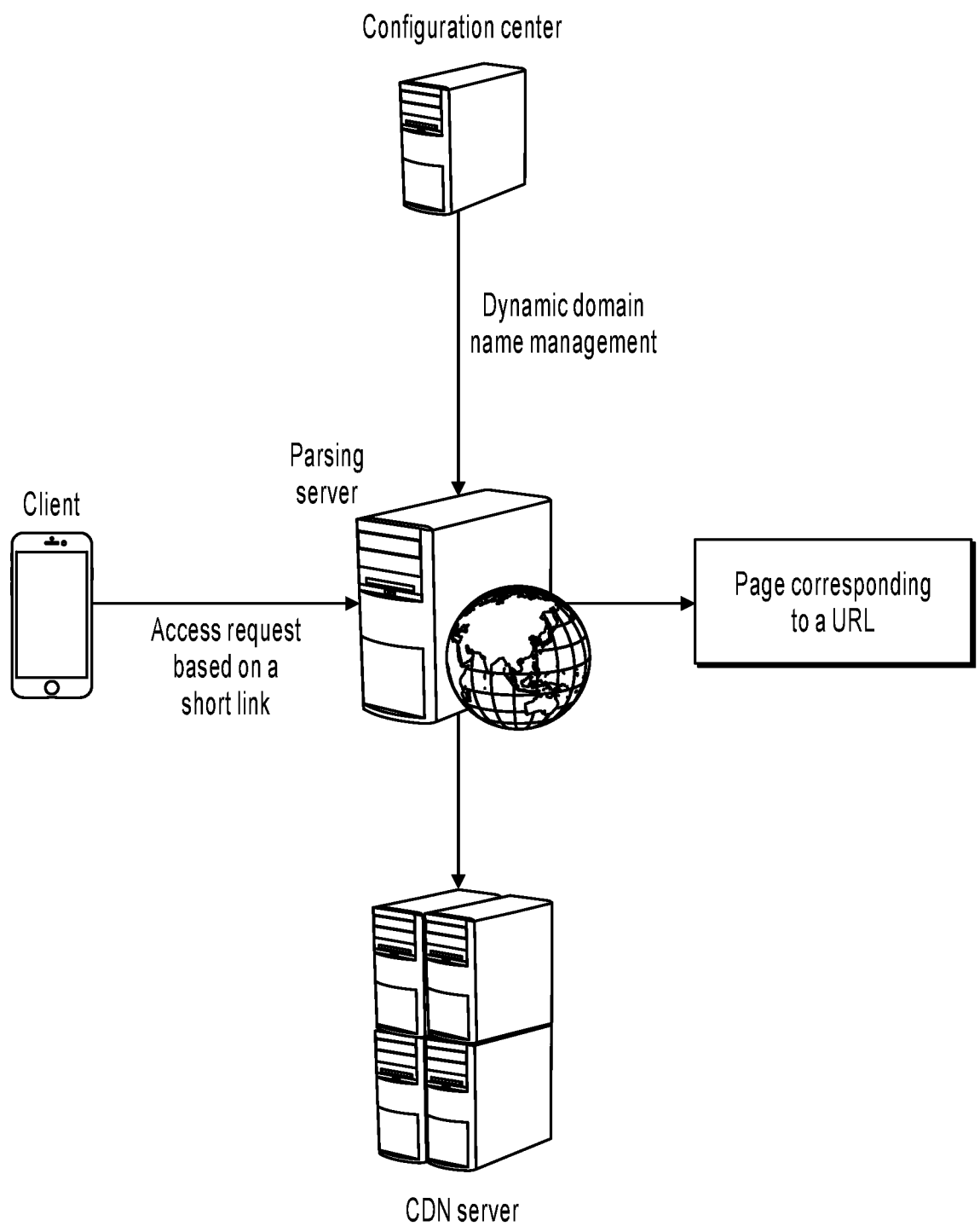
FIG. 1 is a schematic diagram illustrating an architecture that a short-link parsing method is based on, according to an implementation of the present specification.

In one or more implementations of the present specification, the architecture shown in FIG. 1 can be used for a short-link parsing method. In FIG. 1, at least a client, a parsing server, a CDN server, and a configuration center can be included.

Wherein the client can include a social application (APP) provided by a service provider, or can include a short message service (SMS) function included in an operating system of an end-user device. The client can display service content that includes a short link to a user, and then the user can click the short link to access a network. In some actual application scenarios, the end-user device can include a device such as a mobile end-user device, a computer, or a server. Implementations constitute no limitation on the present application here.

The parsing server can be a domain name system (DNS) server, usually uses a distributed cluster architecture, and is configured to receive an access request from the client, and parse and redirect a short link.

The CDN server stores a corresponding backup page and corresponding page content. When access traffic of the parsing server is excessively heavy, the parsing server redirects a URL corresponding to a short link to the backup page stored in the CDN server, to ensure service stability.

The configuration center can be a server or a server cluster having a configuration management function. The configuration center can define a long link. In subsequent description, the configuration center is referred to as a "configuration server". Implementations constitute no limitation on the present application here.

The following describes, based on the architecture shown in FIG. 1, a short link parsing process provided in the implementations of the present specification.

Figure 2:
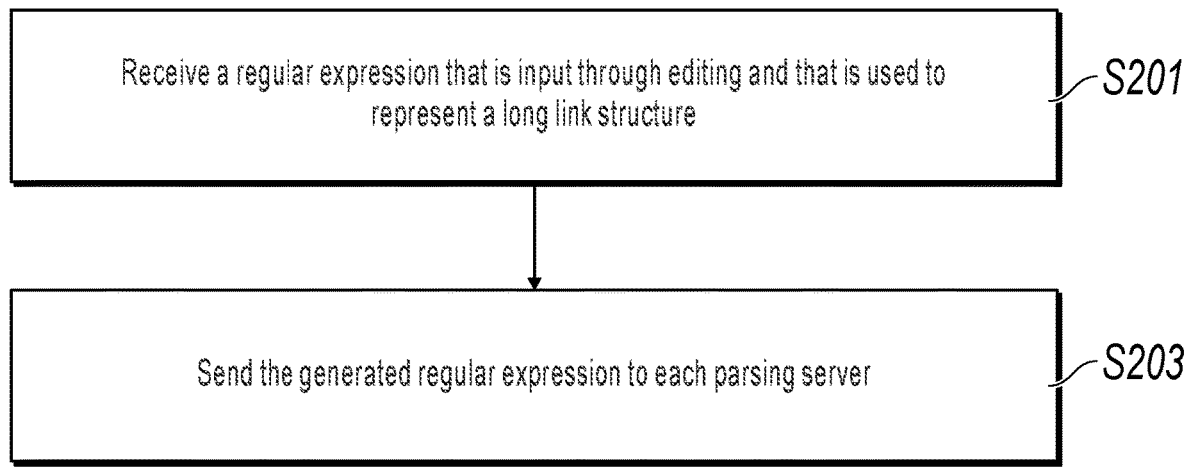
FIG. 2 illustrates a short link parsing process on a configuration server side, according to an implementation of the present specification.

For a configuration server, an implementation of the present specification provides a short-link parsing method. As shown in FIG. 2, the short-link parsing method can be performed by the configuration server. The method includes the following steps.

Step S201: Receive a regular expression that is input through editing and that is used to represent a long link structure.

In practice, service personnel of a service provider can define a standard structure of a long link based on actual service demand. In one or more implementations of the present specification, the service personnel can edit a corresponding regular expression in the configuration server, and define a standard structure of a corresponding long link by means of the manner of the regular expression.

It is worthwhile to note that the standard structure usually can include a standard domain name, a character format, a character type, etc. in the long link. It can be seen that after the standard structure of the long link is defined, a reference criterion can be provided in a process of parsing a short link.

For example, assume that a regular expression is represented as "http (s)?://(taobao)\.(Com/net/cn)". It can be seen that as defined in the regular expression, the standard structure of the long link should include three parts: a transport protocol "http (s)"+a domain name subject "taobao"+a domain name suffix "com/net/cn".

Based on the previous content, the configuration server can receive the long link regular expression input by the service personnel through editing.

Step S203: Send the generated regular expression to each parsing server.

In the present implementation of the present specification, the configuration server sends the defined regular expression to each parsing server, so that each parsing server checks a parsing result (a long link obtained through parsing) of the short link based on the regular expression, and performs redirection based on the check result.

In an actual application scenario, a page that a long link corresponding to a short link points to may not be a service content page provided by the service provider, or can even be a dangerous website. Therefore, it can be seen from the regular expression in the present implementation of the present specification that if the parsing result of the short link matches the regular expression, it indicates that the long link corresponding to the short link is a link predefined by the service provider, which can ensure link security. In this case, the parsing server accesses the long link obtained after the short link is parsed.

In the previous example, a long link obtained after a short link is parsed can be accessed when the long link matches the standard structure.

Based on the previous content, in a feasible implementation, different regular expressions can be defined for different services.

For example, as shown in Table 1, regular expressions corresponding to different services are displayed.

TABLE 1

| Service type | Regular expression |
|---|---|
| Payment service | http(s)?://(pay)\.(com\|net\|cn)(:\\d+)?([/;?].*)*$ |
| Multimedia service | http(s)?://(media)\.(com\|net\|cn)(:\\d+)?([/;?].*)*$ |
| Value-added service | http(s)?://(value-added service)\.(com\|net\|cn)(:\\d+)?([/;?].*)*$ |

It can be seen that different services correspond to different long link regular expressions. In an actual application scenario, after the configuration server sends the defined regular expression to different parsing servers, each parsing server can store the regular expression in a regular expression list.

Here, it is worthwhile to note that for meanings and functions of characters, such as "\d", "+", and "?", included in the value-added expression in Table 1, references can be made to description of metacharacters in an existing regular expression. Details are omitted here. In addition, it should be understood that Table 1 is merely an example, and constitutes no limitation on the present application.

In another feasible implementation, long links corresponding to all services can be defined in a same regular expression, for example, http(s)?://([a-z0-9_\\-]+\.)*(alipay-|taobao|tmall|alibaba)\.(com|net|cn|hk|com\.cn). It can be seen that the regular expression includes long link structures involved in different services.

Certainly, the previous two implementations constitute no limitation on the present application. A specific implementation is determined based on an actual demand.

In the previous steps, a secure domain name can be dynamically controlled by means of the manner of the regular expression. When a corresponding secure domain name needs to be deleted, added, or modified, the configuration server can synchronize an updated regular expression to each parsing server in real time.

In addition to the previous content, in an actual service scenario, the parsing server can receive a large number of access requests. Consequently, the parsing server has a very high workload, affecting stable running and processing efficiency of the parsing server. Therefore, in a process of parsing and redirecting a short link, access traffic of a secure domain name corresponding to the short link is further checked, to ensure user access experience and stable running of the server.

In the present implementation of the present specification, two traffic limiting management methods are provided.

Method 1: Traffic management is performed for different domain names. The configuration server configures a corresponding traffic limiting threshold for any domain name, and sends the threshold to each parsing server. As such, each parsing server can perform traffic limiting management based on the traffic limiting threshold. For example, the parsing server can count requests of a certain domain name within a specified time period (for example, 30 s), and can reject an access request if average access traffic per second is greater than the configured traffic limiting threshold. In practice, the configuration server can synchronize the configured traffic limiting threshold to a memory of each parsing server. Therefore, for each parsing server, the configured traffic limiting threshold takes effect in real time.

Method 2: Traffic limitation is performed based on a CDN address. In an actual application scenario, access traffic in some time periods (for example, a promotion period of an e-commerce platform) can be excessively heavy, and such access traffic can lead to a sharp increase in the workload of the parsing server, or even the workload far exceeds a bearer capability of the parsing server. Therefore, to ensure normal working of the parsing server in this scenario, the configuration server can release, based on a short link, a page resource in a service content page corresponding to the short link on a CDN server, generate a corresponding CDN address, and establish a mapping relationship between a short code value of the short link and the CDN address. As such, when the access traffic is excessively heavy or a malicious attack occurs, the configuration server can push an emergency message to the parsing server. After receiving an access request based on a short link, the parsing server obtains a short code value, queries, based on the pre-stored mapping relationship, a CDN address corresponding to the short code value, and redirects the short link to the CDN address. In this method, system stability of the service provider is ensured by using a buffer capability and functions, such as a load balancing function, of the CDN server.

Figure 3:
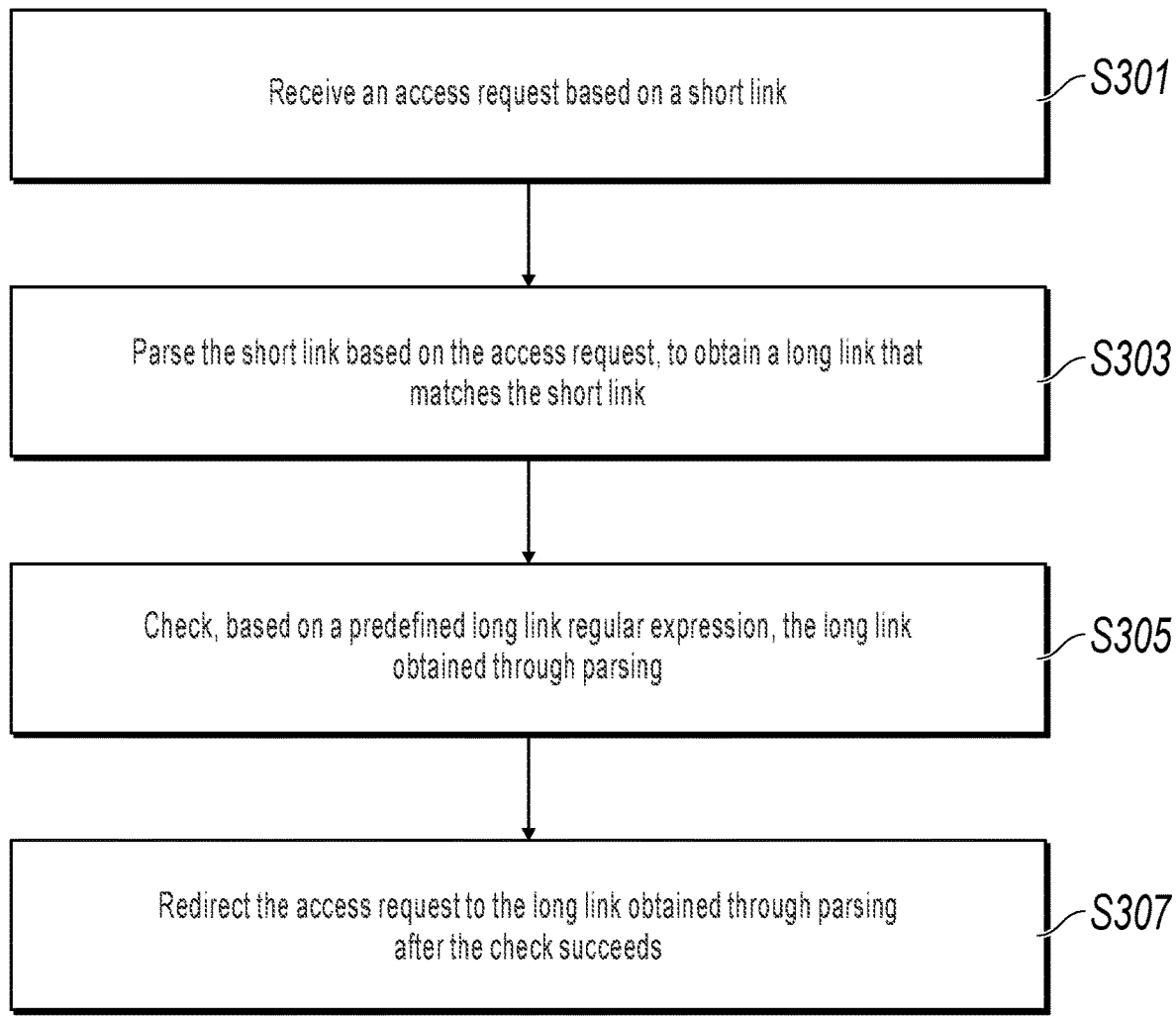
FIG. 3 illustrates a short link parsing process on a parsing server side, according to an implementation of the present specification.

The previous description is based on a configuration server side. For a parsing server, an implementation of the present specification further provides a short-link parsing method. As shown in FIG. 3, the method includes the following steps.

Step S301: Receive an access request based on a short link.

As described above, a service provider can release corresponding service content in a short link form in social media. Based on this, it can be seen that the access request can be sent by a user by triggering (for example, clicking) the short link in the social media.

Step S303: Parse the short link based on the access request, to obtain a long link that matches the short link.

In an actual application scenario, a short link is usually generated based on a long link, in other words, the short link usually corresponds to the corresponding long link. Then, the parsing server can obtain the matched long link after parsing the short link, In the present implementation of the present specification, the long link can be a CDN address, or can be a URL that points to a service content page. Implementations are not limited here.

Step S305: Check, based on a predefined long link regular expression, the long link obtained through parsing, where the long link regular expression is sent by a configuration server.

In the present implementation of the present specification, checking, based on the long link regular expression, the long link obtained through parsing can be considered as checking whether the long link obtained through parsing satisfies the regular expression. If the long link satisfies the regular expression, it can be considered that the long link is a secure link.

Step S307: Redirect the access request to the long link obtained through parsing after the check succeeds.

It is worthwhile to note that as described above, in an actual application scenario, the configuration server sends configured traffic limiting information (for example, a traffic limiting threshold and a CDN address) to each parsing server, so that each parsing server performs traffic limiting control in a process of parsing a short link.

Based on this, in the method shown in FIG. 3, the parsing the short link based on the access request, to obtain a long link that matches the short link can include: determining a short code value corresponding to the short link; determining, based on a pre-established mapping relationship between a short code value and a CDN address, whether the short code value of the short link that the access request is based on corresponds to a CDN address; and if yes, returning the CDN address, and using the CDN address as the long link obtained through parsing; otherwise, determining, based on the short code value, a long link that has a pre-established mapping relationship with the short code value, and using the long link as the long link obtained through parsing.

In addition, the checking the long link obtained through parsing can include: checking whether the long link matches the predefined long link regular expression; and if yes, determining that the check succeeds; otherwise, determining that the check fails.

Further, the redirecting the access request to the long link obtained through parsing can include: determining a domain name corresponding to the long link; collecting statistics about access traffic of the domain name within a specified time period; determining, based on the access traffic and a traffic limiting threshold preset for the domain name, whether the access traffic of the domain name corresponding to the long link exceeds the traffic limiting threshold; and if yes, redirecting the access request to a predetermined traffic limiting page; otherwise, redirecting the access request to the long link obtained through parsing.

The traffic limiting page described here can be a page that includes traffic limiting prompt information. For example, prompt information such as "the server is busy, access is performed in a queue, and please wait" is displayed on the page. Certainly, the implementation is merely an example here, and constitutes no limitation on the present application.

Figure 4:
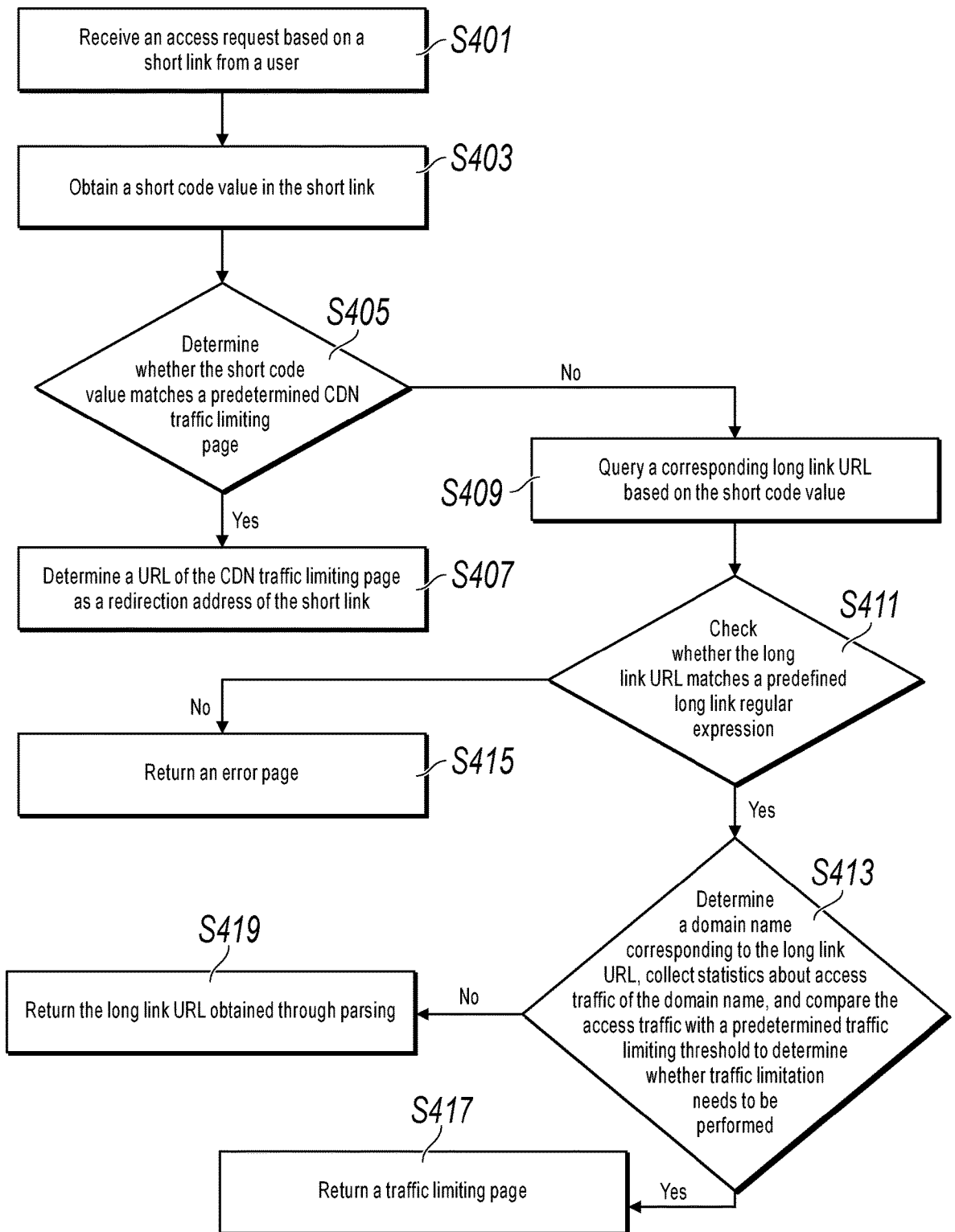
FIG. 4 is a schematic diagram illustrating a short link parsing execution procedure in practice, according to an implementation of the present specification.

Based on the previous content, in practice, a completed short link parsing procedure can be shown in FIG. 4. The procedure includes the following steps.

Step S401: Receive an access request based on a short link from a user.

Step S403: Obtain a short code value in the short link.

Step S405: Determine whether the short code value matches a predetermined CDN traffic limiting page; and if yes, perform step S407; otherwise, perform step 409.

Step 407: Determine a URL of the CDN traffic limiting page as a redirection address of the short link.

Step S409: Query a corresponding long link URL based on the short code value.

Step S411: Check whether the long link URL matches a predefined long link regular expression; and if yes, perform step S413; otherwise, perform step S415.

Step S413: Determine a domain name corresponding to the long link URL, collect statistics about access traffic of the domain name, and compare the access traffic with a predetermined traffic limiting threshold to determine whether traffic limitation needs to be performed; and if yes, perform step S417; otherwise, perform step S419.

Step S415: Return an error page.

Step S417: Return a traffic limiting page.

Step S419: Return the long link URL obtained through parsing.

Figure 5:
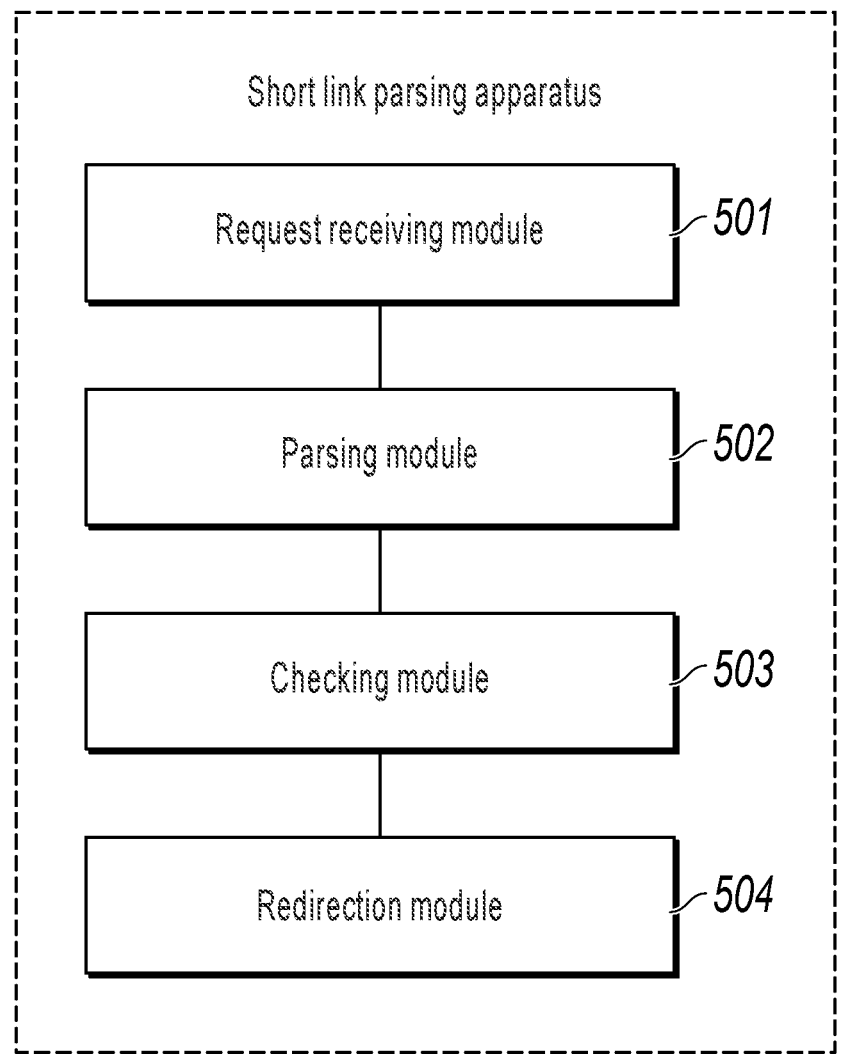
FIG. 5 is a schematic structural diagram of a short link parsing apparatus on a configuration server side, according to an implementation of the present specification.

The short-link parsing method provided in the implementations of the present specification is described above. Based on the same idea, an implementation of the present specification further provides a short link parsing apparatus. As shown in FIG. 5, the apparatus includes: a request receiving module 501, configured to receive an access request based on a short link; a parsing module 502, configured to parse the short link based on the access request, to obtain a long link that matches the short link; a checking module 503, configured to check, based on a predefined long link regular expression, the long link obtained through parsing, where the long link regular expression is sent by a configuration server; and a redirection module 504, configured to redirect the access request to the long link obtained through parsing after the check succeeds.

Further, the parsing module 502 is configured to determine a short code value corresponding to the short link; determine, based on a pre-established mapping relationship between a short code value and a CDN address, whether the short code value of the short link that the access request is based on corresponds to a CDN address; and if yes, return the CDN address, and use the CDN address as the long link obtained through parsing; otherwise, determine, based on the short code value, a long link that has a pre-established mapping relationship with the short code value, and use the long link as the long link obtained through parsing.

The checking module 503 is configured to check whether the long link matches the predefined long link regular expression; and if yes, determine that the check succeeds; otherwise, determine that the check fails.

The redirection module 504 is configured to determine a domain name corresponding to the long link; collect statistics about access traffic of the domain name within a specified time period; determine, based on the access traffic and a traffic limiting threshold preset for the domain name, whether the access traffic of the domain name corresponding to the long link exceeds the traffic limiting threshold; and if yes, redirect the access request to a predetermined traffic limiting page; otherwise, redirect the access request to the long link obtained through parsing.

Figure 6:
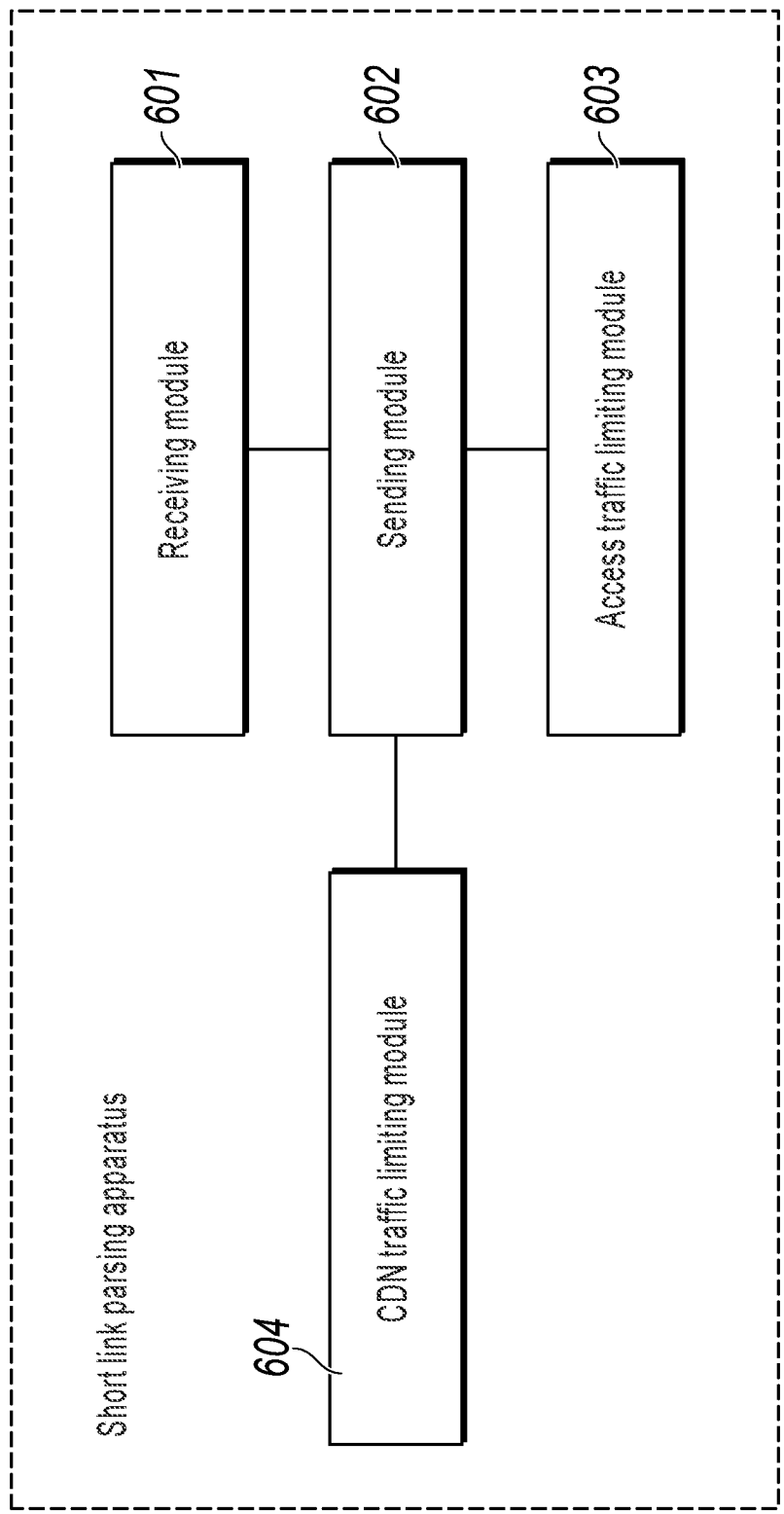
FIG. 6 is a schematic structural diagram of a short link parsing apparatus on a parsing server side, according to an implementation of the present specification.

As shown in FIG. 6, an implementation of the present specification further provides a short link parsing apparatus. The apparatus includes: a receiving module 601, configured to receive a regular expression that is input through editing and that is used to represent a long link structure; and a sending module 602, configured to send the generated regular expression to each parsing server, so that any one of the parsing servers checks and redirects a received short link request based on the regular expression.

Further, the apparatus includes an access traffic limiting module 603, configured to configure a traffic limiting threshold for any domain name; and update the traffic limiting threshold to each parsing server.

The apparatus further includes a CDN traffic limiting module 604, configured to determine a URL page resource corresponding to a short link; release the page resource on a CDN server, and generate a CDN address; and establish a mapping relationship between a short code value of the short link and the CDN address, and send the mapping relationship to each parsing server.

An implementation of the present specification further provides a short link parsing device on a parsing server side. The device includes: a memory, configured to store a short link parsing program; a communications interface, configured to receive an access request based on a short link; and a processor, configured to call the short link parsing program stored in the memory and perform the following operations after the communications interface receives the access request based on the short link: parsing the short link based on the access request, to obtain a long link that matches the short link; checking, based on a predefined long link regular expression, the long link obtained through parsing, where the long link regular expression is sent by a configuration server; and redirecting the access request to the long link obtained through parsing after the check succeeds.

Similarly, an implementation of the present specification further provides a short link parsing device on a configuration server side. The device includes: a memory, configured to store a regular expression configuration program; a communications interface; and a processor, configured to call the regular expression configuration program stored in the memory and perform the following operations: receiving a regular expression that is input through editing and that is used to represent a long link structure; and sending the regular expression to each parsing server through the communications interface, so that any one of the parsing servers checks and redirects a received short link request based on the regular expression.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related description in the method implementation.

Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily require a particular execution sequence to achieve the desired results. In some implementations, multitasking and parallel processing can be advantageous.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component; or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is described by dividing functions into various units. Certainly, when the present application is implemented, functions of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a special-purpose computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or other programmable data processing devices, so that a series of operations and steps are performed on the computer or the other programmable devices, thereby generating computer-implemented processing. Therefore, the instructions executed on the computer or the other programmable devices provide steps for implementing a specific function in one or more processes in the flowcharts and/or in one or more blocks in the block diagrams.

In a typical configuration, a computing device includes one or more processors (CPU), input/output interfaces, network interfaces, and memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a magnetic cassette, a magnetic tape, a magnetic disk storage or another magnetic storage device, or any other non-transmission medium that can be used to store information accessible to the computing device. Based on the definition in the present specification, the computer readable medium does not include transitory computer readable media (transitory media) such as a modulated data signal and carrier.

It is worthwhile to further note that the terms "include", "comprise", or their any other variants are intended to cover a nonexclusive inclusion, so that a process, a method, a product, or a device that includes a list of elements not only includes those elements but also includes other elements which are not expressly listed, or further includes elements inherent to such process, method, product, or device. An element preceded by "includes a . . . " does not, without more constraints, preclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of executable computer instructions executed by a computer, for example, a program module. The program module usually includes a routine, a program, an object, a component, a data structure, etc. for executing a specific task or implementing a specific abstract data type. The present application can alternatively be practiced in distributed computing environments. In the distributed computing environments, tasks are executed by remote processing devices that are connected through a communications network. In the distributed computing environment, the program module can be located in both local and remote computer storage media including storage devices.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related description in the method implementation.

The previous descriptions are merely implementations of the present application, and are not intended to limit the present application. For a person skilled in the art, various modifications and changes can be made to the present application. Any modification, equivalent replacement, improvement, etc. made within the spirit and the principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented short-link parsing method, comprising:
   receiving an access request based on a short link;
   processing the short link of the access request to obtain a long link corresponding to the short link;
   determining that the long link satisfies a predefined long link regular expression, wherein the predefined long link regular expression is sent by a configuration server; and
   redirecting the access request to the long link after determining that the long link satisfies the predefined long link regular expression including:
   determining a domain name corresponding to the long link;
   collecting statistics about access traffic of the domain name within a specified time period;
   determining, based on the access traffic and a traffic limiting threshold preset for the domain name, whether the access traffic of the domain name corresponding to the long link exceeds the traffic limiting threshold;
   in response to determining that the access traffic of the domain name corresponding to the long link exceeds the traffic limiting threshold, redirecting the access request to a predetermined traffic limiting page; and
   in response to determining that the access traffic of the domain name corresponding to the long link does not exceed the traffic limiting threshold, redirecting the access request to the long link.

2. The computer-implemented method according to claim 1, wherein processing the short link of the access request to obtain a long link corresponding to the short link comprises:
   determining a short code value corresponding to the short link;
   determining, based on a pre-established mapping relationship between a short code value and a content delivery network (CDN) address, whether the short code value of the short link that the access request is based on corresponds to a CDN address;
   in response to determining that the short code value of the short link that the access request is based on corresponds to a CDN address, returning the CDN address, and using the CDN address as the long link obtained through parsing; and
   in response to determining that the short code value of the short link that the access request is based on does not correspond to a CDN address, determining, based on the short code value, a long link that has a pre-established mapping relationship with the short code value, and using the long link as the long link obtained through parsing.

3. The computer-implemented method according to claim 1, further comprising:
   in response to determining that the long link does not satisfy the predefined long link regular expression, determining not to redirect the access request to the long link.

4. The computer-implemented method according to claim 1, further comprising:
   receiving a regular expression that is input through editing and that is used to represent a long link structure; and
   sending the regular expression to each parsing server of one or more parsing servers, wherein at least one of the one or more parsing servers checks and redirects a received short link request based on the regular expression.

5. The computer-implemented method according to claim 4, wherein the computer-implemented method further comprises:
   configuring a traffic limiting threshold for any domain name; and
   sending the traffic limiting threshold to each parsing server of the one or more parsing servers.

6. The computer-implemented method according to claim 4, wherein the computer-implemented method further comprises:
   determining a page resource corresponding to a short link;
   releasing the page resource on a CDN server;
   generating a CDN address corresponding to the page resource;
   establishing a mapping relationship between a short code value of the short link and the CDN address; and
   sending the mapping relationship to each parsing server of the one or more parsing servers.

7. A non-transitory computer-readable medium storing one or more instructions executable by a computer system to perform operations comprising:
   receiving an access request based on a short link;
   processing the short link of the access request to obtain a long link corresponding to the short link;
   determining that the long link satisfies a predefined long link regular expression, wherein the predefined long link regular expression is sent by a configuration server; and
   redirecting the access request to the long link after determining that the long link satisfies the predefined long link regular expression including:
   determining a domain name corresponding to the long link;
   collecting statistics about access traffic of the domain name within a specified time period;
   determining, based on the access traffic and a traffic limiting threshold preset for the domain name, whether the access traffic of the domain name corresponding to the long link exceeds the traffic limiting threshold;
   in response to determining that the access traffic of the domain name corresponding to the long link exceeds the traffic limiting threshold, redirecting the access request to a predetermined traffic limiting page; and
   in response to determining that the access traffic of the domain name corresponding to the long link does not exceed the traffic limiting threshold, redirecting the access request to the long link obtained through parsing.

8. The non-transitory computer-readable medium of claim 7, wherein processing the short link of the access request to obtain a long link corresponding to the short link comprises:

determining a short code value corresponding to the short link;

determining, based on a pre-established mapping relationship between a short code value and a content delivery network (CDN) address, whether the short code value of the short link that the access request is based on corresponds to a CDN address;

in response to determining that the short code value of the short link that the access request is based on corresponds to a CDN address, returning the CDN address, and using the CDN address as the long link obtained through parsing; and in response to determining that the short code value of the short link that the access request is based on does not correspond to a CDN address, determining, based on the short code value, a long link that has a pre-established mapping relationship with the short code value, and using the long link as the long link obtained through parsing.

9. The non-transitory computer-readable medium of claim 7, wherein the operations further comprise:

in response to determining that the long link does not satisfy the predefined long link regular expression, determining not to redirect the access request to the long link.

10. The non-transitory computer-readable medium of claim 7, wherein the operations further comprise:

receiving a regular expression that is input through editing and that is used to represent a long link structure; and sending the regular expression to each parsing server of one or more parsing servers, wherein at least one of the one or more parsing servers checks and redirects a received short link request based on the regular expression.

11. The non-transitory computer-readable medium of claim 10, wherein the operations further comprise:

configuring a traffic limiting threshold for any domain name; and sending the traffic limiting threshold to each parsing server of the one or more parsing servers.

12. The non-transitory computer-readable medium of claim 10, wherein the operations further comprise:

determining a page resource corresponding to a short link;

releasing the page resource on a CDN server;

generating a CDN address corresponding to the page resource;

establishing a mapping relationship between a short code value of the short link and the CDN address; and sending the mapping relationship to each parsing server of the one or more parsing servers.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving an access request based on a short link;

processing the short link of the access request to obtain a long link corresponding to the short link;

determining that the long link satisfies a predefined long link regular expression, wherein the predefined long link regular expression is sent by a configuration server; and redirecting the access request to the long link after determining that the long link satisfies the predefined long link regular expression including:

determining a domain name corresponding to the long link;

collecting statistics about access traffic of the domain name within a specified time period;

determining, based on the access traffic and a traffic limiting threshold preset for the domain name, whether the access traffic of the domain name corresponding to the long link exceeds the traffic limiting threshold;

in response to determining that the access traffic of the domain name corresponding to the long link exceeds the traffic limiting threshold, redirecting the access request to a predetermined traffic limiting page; and in response to determining that the access traffic of the domain name corresponding to the long link does not exceed the traffic limiting threshold, redirecting the access request to the long link obtained through parsing.

14. The computer-implemented system of claim 13, wherein processing the short link of the access request to obtain a long link corresponding to the short link comprises:

determining a short code value corresponding to the short link;

determining, based on a pre-established mapping relationship between a short code value and a content delivery network (CDN) address, whether the short code value of the short link that the access request is based on corresponds to a CDN address;

in response to determining that the short code value of the short link that the access request is based on corresponds to a CDN address, returning the CDN address, and using the CDN address as the long link obtained through parsing; and in response to determining that the short code value of the short link that the access request is based on does not correspond to a CDN address, determining, based on the short code value, a long link that has a pre-established mapping relationship with the short code value, and using the long link as the long link obtained through parsing.

15. The computer-implemented system of claim 13, wherein the one or more operations further comprise:

in response to determining that the long link does not satisfy the predefined long link regular expression, determining not to redirect the access request to the long link.

16. The computer-implemented system of claim 13, wherein the one or more operations further comprise:

receiving a regular expression that is input through editing and that is used to represent a long link structure; and sending the regular expression to each parsing server of one or more parsing servers, wherein at least one of the one or more parsing servers checks and redirects a received short link request based on the regular expression.

17. The computer-implemented system of claim 16, wherein the one or more operations further comprise:

configuring a traffic limiting threshold for any domain name; and sending the traffic limiting threshold to each parsing server of the one or more parsing servers.

* * * * *